Patented Jan. 10, 1939

2,143,816

UNITED STATES PATENT OFFICE 2,143,816

DITHIOHYDANTOINS

Ralph A. Jacobson, Wilmington, Del., assignor to E. I. du Pont de Nemours & Company, Wilmington, Del., a corporation of Delaware No Drawing. Application February 23, 1937, Serial No. 127,196

16 Claims. (Cl. 260—298)

This invention relates to heterocyclic compounds and their preparation, and more particularly to thiohydantoins.

An object of this invention is to provide new and useful organic compounds which are analogous to the hydantoins but differ therefrom in having thiocarbonyl (C=S) groups instead of carbonyl (C=O) groups. Another object is to prepare reaction products of carbon disulfide and certain amino nitriles. A more specific object of this invention is to prepare organic compounds of the type represented by the comprehensive formula

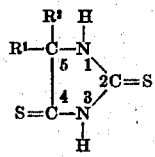

in which $R^1$ and $R^2$ are hydrogen atoms or hydrocarbon radicals, such as alkyl, aralkyl, aryl, or alicyclic groups.

The above and other objects appearing hereinafter are accomplished by reacting carbon disulfide with an α-aminomononitrile having at least one amino-hydrogen atom, in accordance with the method set forth below.

In practicing the invention, an α-aminomononitrile of the type just given is mixed with carbon disulfide under normal conditions of pressure and temperature, i. e., room temperature (about 25° C.) and atmospheric pressure (about 760 mm.). An exothermic reaction takes place with formation of a crystalline solid which may be purified if desired by dissolving in dilute aqueous alkali, precipitating with a mineral acid such as hydrochloric, and recrystallizing the product from water, alcohol, or a mixture of the same. When a primary α-aminonitrile is employed, this product is a dithiohydantoin coming under the above general formula. When the α-aminonitrile is secondary, a different ring structure is believed to be formed.

Considerable latitude in temperature is permissible without sacrificing any of the advantages of this invention, but, because of the exothermic nature of the reaction between carbon disulfide and the α-aminonitrile, external heating is unnecessary. On the contrary, the reactions of this invention proceed so rapidly and exothermically as to make desirable dilution or external cooling or both. Accordingly, it is preferred to carry out the process in the presence of a diluent which is inert both to the reactants and to the reaction product. Considerable variation as to diluent is also permissible, it being possible to use aromatic hydrocarbons such as benzene, toluene, and xylene; aliphatic hydrocarbons such as petroleum ether, ligroin, and kerosene; chlorinated hydrocarbons such as chloroform, carbon tetrachloride, ethylene dichloride, chlorobenzene, and trichloroethylene; and ethers such as diethyl ether and dioxane.

Any α-aminonitrile of the general formula $$R^2NHC(R^1)(R^3)-CN$$

wherein $R^1$, $R^2$, and $R^3$ have the values previously given, is applicable in the reaction of this invention, among them the following: $NH_2CH_2CN$, $NH_2C(CH_3)_2CN$, $NH_2C(CH_3)(C_2H_5)CN$, $NH_2CH(CH_3)CN$, $NH_2CH(C_6H_5)CN$, $CH_3NHCH_2CN$, $CH_3NHC(CH_3)_2CN$, $C_2H_5NHC(C_2H_5)_2CN$, $C_4H_9NHCH(C_6H_5)CN$,

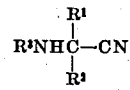

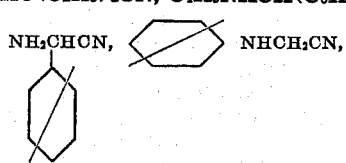

and

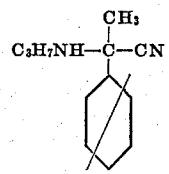

The line drawn through the phenyl rings, in the last three nitriles above, indicates that these are cyclohexane rings.

This invention is not to be limited thereby but will be more clearly understood by reference to the following examples in which there are described in detail a series of specific preferred embodiments.

*Example I—Dithiohydantoin*

To a solution of 19 g. (0.25 mol) of carbon disulfide in 25 cc. of benzene contained in a 1-liter flask fitted with a reflux condenser was slowly added a suspension of 28 g. of amino-acetonitrile ($NH_2CH_2CN$) in 50 cc. of benzene. The reaction mixture was allowed to stand for several days during which it solidified. The product was dissolved in sodium hydroxide solution and the dithiohydantoin reprecipitated with hydrochloric acid. Analysis of the crystals showed a sulfur content of 48.87% whereas the calculated amount for dithiohydantoin is 48.48%. This compound has the formula

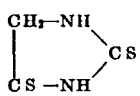

*Example II.—5,5-Dimethyldithiohydantoin*

To 336 g. of carbon disulfide contained in a 3-liter round-bottom flask fitted with a long reflux condenser was added 740 g. of α-aminoisobutyronitrile. In order to control the reaction it was necessary to add the nitrile in four portions with cooling after each addition. The reaction mixture was allowed to stand for two days during which a voluminous mass of yellow crystals had separated. The crystals were filtered off and the filtrate allowed to stand for several days during which it solidified to a crystalline mass. The whole of the crystalline product was dissolved in 10% sodium hydroxide solution by warming on a steam bath and the solution then treated with concentrated hydrochloric acid until acid to litmus. The crystals were filtered off and dried at room temperature. The product weighed 739 g. and melted at 140–143° C. Crystallization of a small portion of the product from hot water yielded pale yellow glistening needles melting at 143° C. They were identified as the desired compound by elementary analysis and a series of chemical reactions. Analysis showed 37.44% carbon, 5.00% hydrogen, 16.95% nitrogen, and 40.16% sulfur, whereas the calculated values for 5,5-dimethyldithiohydantoin are 37.45%, 5.00%, 17.50%, and 40.00% respectively. The product of this example upon being heated was stable to about 270° C. but began to decompose at this temperature with evolution of hydrogen sulfide and formation of a black tar. It could be recrystallized intact from boiling 6N hydrochloric acid. It formed a mercury salt stable to boiling water and a silver salt which decomposed on long boiling with water yielding a black precipitate of silver sulfide but no detectable amount of a mustard oil. The compound of this example reacted with cold ammoniacal hydrogen peroxide to form 5,5-dimethylhydantoin. It reacted both with silver oxide and with boiling concentrated hydrochloric acid to give a compound having the correct nitrogen and sulfur content for 5,5-dimethyl-4-thiohydantoin. The above analysis and chemical behavior show that the compound of the example could not be cyanoisopropyldithiocarbamic acid (possible in view of the synthetic method) but was instead 5,5-dimethyldithiohydantoin, of the formula

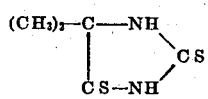

*Example III—Methylaminoacetonitrile-carbon disulfide reaction product*

To a solution of 17.5 g. (0.25 mol) of methylaminoacetonitrile ($CH_3NHCH_2CN$) in 500 cc. of benzene was slowly added 9.5 g. of carbon disulfide. The reaction was moderated by external cooling with ice. The reaction mixture separated into two layers, the benzene forming the upper layer. Upon standing for an hour, the lower layer solidified to a brown thick mass. Purification of the latter was effected by dissolving it in 10% sodium hydroxide solution, cooling, and precipitating with hydrochloric acid. The product was pale yellow in color and weighed 12 g. Upon crystallization from alcohol or acetic acid pale yellow crystals melting at 82–83° C. were obtained. Upon analysis the product was found to have a sulfur content of 44.01%

*Example IV—α-(methylamino) isobutyronitrile-carbon disulfide reaction product*

To a solution of 24.5 g. (0.25 mol) of -(methylamino)isobutyronitrile ($CH_3NHC(CH_3)_2CN$) in 50 cc. of benzene was slowly added 9.5 g. of carbon disulfide. The mixture was allowed to stand for several weeks and then distilled. After distillation of the benzene and recovery of 3 g. of unchanged methylaminoisobutyronitrile, distillation was discontinued and the crude product obtained as the residue in the distilling flask (28 g.). Upon crystallization from alcohol, pale yellow crystals melting at 83.5–84.5° C. were obtained. Upon analysis, the product was found to have a sulfur content of 36.29%.

The dithiohydantoins of the present invention have been named in accordance with the accepted nomenclature of the hydantoins. In other words the nitrogen atom adjacent to the methylene carbon is assigned ring position No. 1, the other annular atoms being given succeeding numbers in clockwise fashion around the ring. Further as to nomenclature it will be understood that the term "dithiohydantoin" as used herein, is a generic one and includes not only dithiohydantoin itself but also compounds in which the hydrogen atoms of ring atom 5 are replaced, as by hydrocarbon radicals.

The products of the present invention are useful as corrosion inhibitors for metal pickling baths, as insecticides, and as resin intermediates (reaction with formaldehyde). As a general rule, the purification steps outlined in the above examples, while desirable, are not essential to obtain products suitable for the above purposes.

Various changes may be made in the details and methods of this invention without departing therefrom or sacrificing any of the advantages thereof, and I do not limit myself except as in the following claims.

I claim:

1. A 2,4-dithiohydantoin.
2. A 2,4-dithiohydantoin in which at least one hydrogen atom attached to ring atom 5 is replaced by a hydrocarbon radical.
3. A 2,4-dithiohydantoin in which at least one hydrogen atom attached to ring atom 5 is replaced by an alkyl radical.
4. A 2,4-dithiohydantoin in which at least one hydrogen atom attached to ring atom 5 is replaced by a methyl radical.
5. Dithiohydantoin.
6. A 5,5-dialkyl-2,4-dithiohydantoin.
7. 5,5-dimethyldithiohydantoin.
8. A process which comprises reacting carbon disulfide with an α-aminomononitrile having at least one amino-hydrogen atom.
9. A process according to claim 8 in which at least one hydrogen atom of the aminonitrile is replaced by a hydrocarbon radical.
10. A process for the production of dithiohydantoins which comprises reacting carbon disulfide with a primary α-amino-α,α-dialkylmononitrile having at least one amino-hydrogen atom.
11. A process for the production of dithiohydantoins which comprises reacting carbon disulfide with a primary α-amino-α,α-dimethylmononitrile having at least one amino-hydrogen atom.

12. Process according to claim 8 which is initiated at normal temperatures and pressures.

13. Process according to claim 8 which is initiated at normal temperatures and pressures and in which the initial pressure and temperature conditions are maintained by external cooling.

14. A process which comprises reacting an α-aminomononitrile having at least one amino-hydrogen atom with carbon disulfide in the presence of an inert diluent.

15. A reaction product of carbon disulfide and an α-aminomononitrile having at least one amino hydrogen atom.

16. A reaction product of carbon disulfide and a secondary α-aminomononitrile.

RALPH A. JACOBSON.